No. 713,575. Patented Nov. 11, 1902.
H. VON UFFEL.
CULINARY UTENSIL.
(Application filed Mar. 10, 1902.)
(No Model.)
Fig. 1.
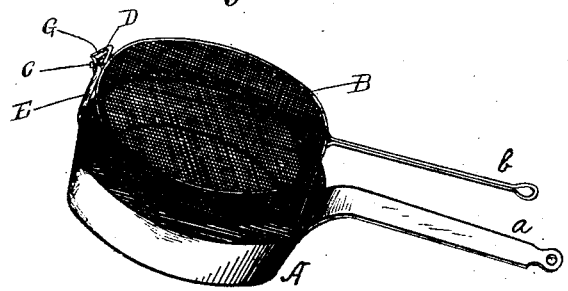
Fig. 2.
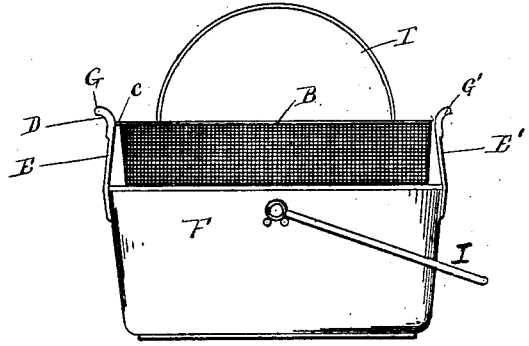
Fig. 3. Fig. 4. Fig. 5.
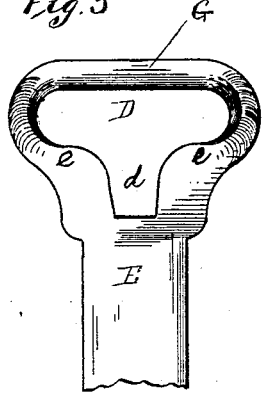 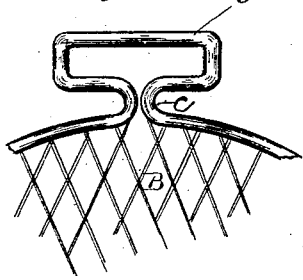 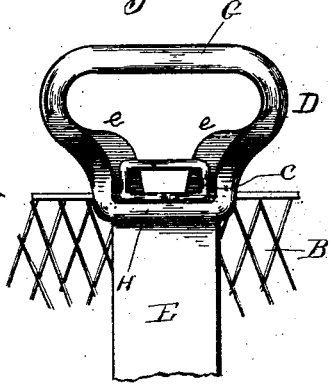
Fig. 6.
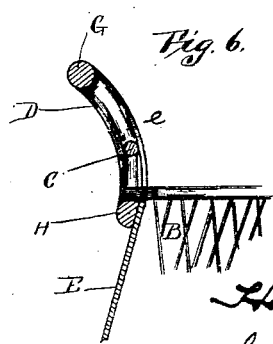
Witnesses:
Jas. E. Babcock
Elmer Seavey
Inventor:
Herman von Uffel
by Wm H Babcock
Attorney.
THE NORRIS PETERS CO., PHOTO-LITHO., WASHINGTON, D. C.

UNITED STATES PATENT OFFICE.

HERMAN VON UFFEL, OF PHILADELPHIA, PENNSYLVANIA, ASSIGNOR TO ROYAL MANUFACTURING COMPANY, LIMITED, A PARTNERSHIP ASSOCIATION OF PENNSYLVANIA.

CULINARY UTENSIL.

SPECIFICATION forming part of Letters Patent No. 713,575, dated November 11, 1902.

Application filed March 10, 1902. Serial No. 97,477. (No model.)

*To all whom it may concern:*

Be it known that I, HERMAN VON UFFEL, a citizen of the United States, residing in the city and county of Philadelphia, in the State of Pennsylvania, have invented certain new and useful Improvements in Culinary Utensils; and I do hereby declare the following to be a full, true, and exact specification of the same, reference being had to the appended drawings, forming a part of the specification, and to the letters of reference marked thereon.

My chief object in the said invention is to provide satisfactory means for holding the basket in position above the pan or other utensil when desired without the assistance of the operator's hand, such means also providing a convenient handle or handles for the utensil.

To this end my invention consists in the construction and combination of parts hereinafter particularly set forth.

In the said drawings, Figure 1 represents a perspective view of a frying-pan and basket embodying my invention. Fig. 2 represents a side elevation of a kettle or deeper pan and basket constituting a modification of the same. Fig. 3 represents a detail rear view, enlarged, of the upper ends of one of the supports and the eye formed therein. Fig. 4 represents a detail view of the hook and the proximate part of the basket. Fig. 5 represents a detail view of the hook engaged with the walls of the eye, proximate parts of the basket and support being also shown. Fig. 6 represents a central vertical section of the same.

A, Fig. 1, designates a frying-pan having the usual handle $a$, and B the draining-basket having a handle $b$. For these handles bails I and I' may be substituted, as shown in Fig. 2, these being used with a kettle, skillet, or deeper pan F. The food is, as usual, placed in the basket, the latter being lowered into the lard or similar material in the pan for cooking and lifted for draining, it being then held approximately in the position shown in Figs. 1 and 2. It is found inconvenient to hold it thus by the operator's hand alone. Consequently a support has been sometimes used at a point diametrically opposite to the handle $a$. Such a support is shown in Fig. 1 rising nearly vertically from the pan, while in Fig. 2 I have shown two such supports diametrically opposite to each other and marked E E'. Heretofore a projecting part or attachment of the rim of the basket has been provided to rest on the support. For this I substitute a flat hook C, preferably integral with the said rim, extending outward therefrom in a neck $c$ and also extending on both sides to form a terminal double hook, as shown in Figs. 4, 5, and 6.

The upper end of each support E is broadened to form an eye D, the lower part of which is narrowed at $d$ by cheeks or flanges $e$, extending inwardly toward each other. In attaching the basket to the pan the neck $c$ is set into the narrow part $d$ of the eye, with the hook catching behind the cheeks or flanges $e\ e$, said neck corresponding in length to the thickness of the said cheeks at its base, so that the rim of the basket is held tightly against the front of the bottom of the eye, Figs. 5 and 6, said hook preferably bearing against the top of a cross-bar H of the eye, and the basket is kept horizontal without any help from the hands of the cook, who is left free for other work during draining.

When the basket and food are to be lowered into the pan or removed altogether from it, the basket is easily lifted, bringing the hook opposite the broad upper part G of the eye, through which it is easily withdrawn. The said upper part is bent outward and upward, as shown in Figs. 1, 2, and 6, so that it forms an auxiliary handle, which is very convenient for picking up the pan alone or the pan and basket together. When two supports and their eyes are used, as in Fig. 2, either one of them may be used to support the basket, and the outwardly-bent upper parts G G' of the eyes make very convenient handles, arranged diametrically opposite each other, for lifting the kettle, as stated.

Having thus described my invention, what I claim as new, and desire to secure by Letters Patent, is—

1. In combination with a draining-basket, provided with an outwardly-extending hook, a pan or like utensil, provided with an upwardly-extending support, having an eye formed therein, which is narrower in its lower part than its upper part, the said hook being adapted to catch behind the walls of the said narrower part and the length of the hook corresponding to the thickness of the eye, in order that they may hold the basket securely horizontal with its rim against the support for the purpose set forth.

2. In combination with a draining-basket having an outwardly-extending hook C, consisting of a neck c and a terminal part extending on both sides thereof and raised vertically, a pan or like utensil having a raised support in the upper end of which is formed an eye D having a broad upper part and a narrower lower part provided with cheeks or flanges e, the lateral parts of the hook catching behind the said cheeks and the length of the neck corresponding to the thickness of the eye, in order that said hook and eye while in engagement may hold the basket securely in horizontal position against the said support substantially as set forth.

3. A pan or like culinary utensil provided with a raised basket-support having an eye formed in it, in combination with a detachable draining-basket, provided with a hook which engages the said eye, these parts being adapted to hold the basket in horizontal position at will and the upper part of the said eye being broadened and bent outward in order that it may not only provide for the convenient detachment of the hook and basket but may also afford a convenient outwardly-bent auxiliary handle for the pan, substantially as set forth.

In testimony whereof I have hereunto set my hand, in the presence of two subscribing witnesses, this 6th day of March, 1902.

HERMAN VON UFFEL.

Witnesses:
  HARRY A. HOLGATE,
  R. E. BABCOCK.